(12) United States Patent
Hawley et al.

(10) Patent No.: US 11,780,609 B2
(45) Date of Patent: Oct. 10, 2023

(54) MAINTENANCE RECOMMENDATIONS USING LIFECYCLE CLUSTERING

(71) Applicant: HONEYWELL INTERNATIONAL INC., Morris Plains, NJ (US)

(72) Inventors: Megan L. Hawley, Roseville, MN (US); Timothy Griffith, Mesa, AZ (US); Cavene Robinson, Gilbert, AZ (US); Ananda Vel Murugan Chandra Mohan, Madurai (IN); Dinkar Mylaraswamy, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 882 days.

(21) Appl. No.: 16/439,062

(22) Filed: Jun. 12, 2019

(65) Prior Publication Data

US 2020/0391884 A1 Dec. 17, 2020

(51) Int. Cl.
*B64F 5/60* (2017.01)
*G06N 5/025* (2023.01)
(Continued)

(52) U.S. Cl.
CPC ............... *B64F 5/60* (2017.01); *G06N 5/025* (2013.01); *G06N 5/04* (2013.01); *G07C 5/085* (2013.01); *G07C 5/0816* (2013.01)

(58) Field of Classification Search
CPC .. B64F 5/60; G06N 5/025; G06N 5/04; G07C 5/0816; G07C 5/085; G06Q 10/00
See application file for complete search history.

(56) References Cited

U.S. PATENT DOCUMENTS 6,122,575 A * 9/2000 Schmidt .............. G06F 11/2252
701/1
7,477,145 B2 1/2009 Tatton et al.
(Continued)

FOREIGN PATENT DOCUMENTS

EP 1162557 A1 12/2001

OTHER PUBLICATIONS

Pansot, Olivier & Ghoniem, Mohammad & Otjacques, Benoit. (2014). Decision Trees and Data Preprocessing to Help Clustering Interpretation. Data 2014—Proceedings of 3rd International Conference on Data Management Technologies and Applications. 10.5220/0005001300480055.
(Continued)

*Primary Examiner* — James J Lee
*Assistant Examiner* — Alexander George Matta
(74) *Attorney, Agent, or Firm* — LORENZ & KOPF, LLP

(57) ABSTRACT

Methods and systems are provided for predictive maintenance of a vehicle component. One method involves mapping a current instance of a component of a vehicle to one of plurality of degradation groups of prior lifecycles for other instances of the component based on a relationship between performance measurement data for the current instance and historical performance measurement data associated with that respective degradation group, obtaining contextual data associated with operation of the vehicle, and determining a maintenance recommendation for the current instance of the component based on the contextual data using a predictive maintenance model associated with the mapped degradation group.

20 Claims, 4 Drawing Sheets

(51) Int. Cl.
*G06N 5/04* (2023.01)
*G07C 5/08* (2006.01)

(56) References Cited

U.S. PATENT DOCUMENTS

| | | | |
|---|---|---|---|
| 9,437,054 B2 | 9/2016 | Catt | |
| 9,581,124 B2 | 2/2017 | Gu et al. | |
| 9,957,052 B2 | 5/2018 | Fox et al. | |
| 2010/0023307 A1* | 1/2010 | Lee | G05B 23/0254 703/7 |
| 2016/0350671 A1* | 12/2016 | Morris, II | G05B 23/0229 |
| 2017/0036768 A1 | 2/2017 | Stieger et al. | |
| 2017/0138922 A1* | 5/2017 | Potyrailo | G01M 13/021 |
| 2017/0344897 A1* | 11/2017 | Alam | G06N 7/005 |
| 2017/0365109 A1* | 12/2017 | Tseng | G07C 5/0808 |
| 2017/0365155 A1* | 12/2017 | Borutta | G06K 9/6247 |
| 2018/0273197 A1 | 9/2018 | Chang et al. | |
| 2019/0019354 A1 | 1/2019 | Jordan | |
| 2019/0164358 A1 | 5/2019 | Hanov et al. | |
| 2019/0244445 A1* | 8/2019 | Kyes | B60L 58/16 |
| 2020/0354086 A1* | 11/2020 | Wang | B64F 5/60 |

OTHER PUBLICATIONS

Kosters, Walter & Marchiori, Elena & A. J. Oerlemans, Ard. (1999). Mining Clusters with Association Rules. Lecture Notes in Computer Science. 10.1007/3-540-48412-4_4.

J. Zhang, B. Zhang, Z. Wang and L. Shi, "Elimination Algorithm of Redundant Association Rules Based on Domain Knowledge," 2010 Seventh Web Information Systems and Applications Conference, Hohhot, 2010, pp. 13-16.

A. M. Chandramohan, D. Mylaraswamy, B. Xu and P. Dietrich, "Big Data Infrastructure for Aviation Data Analytics," 2014 IEEE International Conference on Cloud Computing in Emerging Markets (CCEM), Bangalore, 2014, pp. 1-6.

D. Gorinevsky, K. Dittmar, D. Mylaraswamy and E. Nwadiogbu, "Model-based diagnostics for an aircraft auxiliary power unit," Proceedings of the International Conference on Control Applications, Glasgow, UK, 2002, pp. 215-220 vol. 1.

Chen, Xi, et al. "APU Feature Integration Based on Multi-Variant Flight Data Analysis," IEEE, Aug. 15, 2016, retrieved from: https://ieeexplore.ieee.org/document/7542872 on Feb. 11, 2019.

Liu et al. "Remaining Useful Life Prediction of Aircraft Auxiliary Power Unit with On-Wing Sensing Data," IEEE, Jan. 7, 2019, retrieved from: https://ieeexplore.ieee.org/document/8603352 on Feb. 11, 2019.

* cited by examiner

MAINTENANCE RECOMMENDATIONS USING LIFECYCLE CLUSTERING

TECHNICAL FIELD

The subject matter described herein relates generally to vehicle systems, and more particularly, embodiments of the subject matter relate to providing maintenance recommendations for vehicle components using lifecycle clustering.

BACKGROUND

Due to cost and time requirements, it is desirable to minimize and selectively perform maintenance at intervals where the likely benefits outweigh the costs. At the same time, it is desirable to minimize the risks of performing maintenance too infrequently, particularly for mission critical applications. Therefore, a preventative maintenance approach is often adopted to regularly inspect components. However, scheduled preventive maintenance actions can undesirably increase costs, both in terms of labor and parts, while also undesirably preventing the use of the component being maintained. Accordingly, predictive or condition-based maintenance techniques are often employed to reduce costs that could otherwise be associated with routinely-scheduled preventative maintenance, where maintenance is ideally performed only on an as-needed basis in response to an indication of potential deterioration or degradation.

Practical implementation of predictive or condition-based maintenance for many applications can be difficult due to real-world uncertainties and complexities. For example, in the case of aircraft, some components, such as the auxiliary power unit (APU), may be subjected to extreme operating conditions and exhibit widely variable lifespans in the field (e.g., some APUs may last for thousands of hours while others degrade quickly). Accordingly, it is desirable to provide methods and systems for scheduling or performing maintenance in a manner that accounts for operational variabilities and variable component degradation. Furthermore, other desirable features and characteristics will become apparent from the subsequent detailed description and the appended claims, taken in conjunction with the accompanying drawings and this background.

BRIEF SUMMARY

Methods and systems are provided for monitoring vehicle components. In an exemplary embodiment, a method of monitoring a component of a vehicle involves obtaining measurement data indicative of performance of the component, obtaining contextual data associated with operation of the vehicle, mapping the component to a first degradation group from among a plurality of degradation groups based on a relationship between the measurement data and historical measurement data associated with the first degradation group, and determining a maintenance recommendation for the component based on the contextual data using a predictive maintenance model associated with the first degradation group.

In another embodiment, a method of monitoring an APU onboard an aircraft is provided. The method involves obtaining exhaust gas temperature (EGT) measurement data during operation of the APU, identifying the APU lifecycle as belonging to a first degradation group of APU lifecycles from among a plurality of degradation groups based on a relationship between the EGT measurement data and historical EGT measurement data associated with the APU lifecycles of the first degradation group, determining a predictive maintenance model for the first degradation group based on relationships between the historical EGT measurement data associated with the APU lifecycles of the first degradation group, historical contextual data associated with the APU lifecycles of the first degradation group, and historical maintenance data associated with the APU lifecycles of the first degradation group, obtaining contextual operational data for the APU, and determining a maintenance recommendation for the APU based on the contextual operational data using the predictive maintenance model associated with the first degradation group, wherein a maintenance schedule for the APU is influenced by the maintenance recommendation.

In another embodiment, a system for monitoring and maintaining a component of a vehicle includes a first data storage element to maintain a plurality of predictive maintenance models. Each predictive maintenance model of the plurality is associated with a respective degradation group of a plurality of degradation groups, and each degradation group of the plurality of degradation groups comprises a subset of lifecycles associated with different instances of a vehicle component. The system also includes a computing system to obtain measurement data indicative of performance of a current instance of the vehicle component, map the current instance of the vehicle component to a first degradation group from among the plurality of degradation groups based on a relationship between the measurement data and historical measurement data associated with a first subset of lifecycles comprising the first degradation group, obtain a first predictive maintenance model associated with the first degradation group from the first data storage element, obtain contextual data associated with operation of the current instance of the vehicle component, and determine a maintenance metric value for the current instance of the vehicle component based on the contextual data using the first predictive maintenance model, and a maintenance system coupled to the computing system to determine a maintenance schedule for the current instance of the vehicle component in a manner that is influenced by the maintenance metric value.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
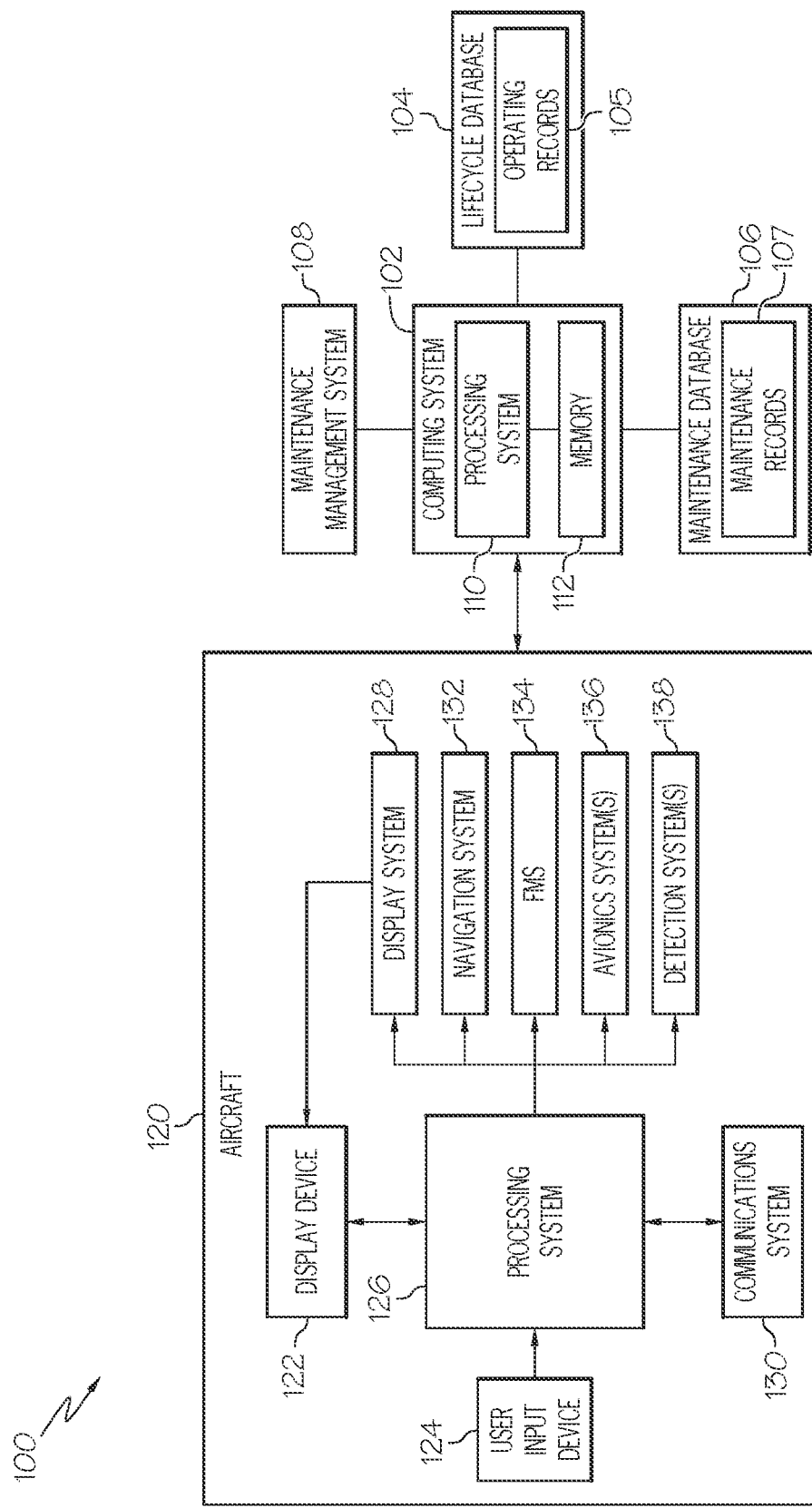
FIG. 1 is a block diagram of a system for monitoring and maintaining a component of a vehicle in an exemplary embodiment.

Embodiments of the subject matter described herein generally relate to systems and methods for determining maintenance recommendations for vehicle components. As described in greater detail below, measurement data indicative of performance of a vehicle component is utilized to classify, categorize, or otherwise map the vehicle component into a particular qualitative degradation group from among a plurality of different potential qualitative degradation groups based on a relationship between the measurement data for the component of interest and historical measurement data associated with the mapped qualitative degradation group. In this regard, the qualitative degradation groups may be defined by different unique subsets of vehicle components having respective measurement data associated therewith that exhibit a similar measurement data pattern. For each qualitative degradation group, an associated predictive maintenance model is determined based on the measurement data associated with the different vehicle components assigned to that qualitative degradation group, contextual operational data associated with the different vehicle components, lifecycle data associated with the different vehicle components, and the like. One or more maintenance recommendations are determined for the vehicle component of interest using the predictive maintenance model for the qualitative degradation group that the component of interest was mapped to.

For example, the measurement data and/or contextual operational data associated with the vehicle component may be input or otherwise provided to a predictive maintenance model for the assigned qualitative degradation group to obtain maintenance recommendations or other metrics or indicia of maintenance actions. In yet other embodiments, the contextual operational data associated with the vehicle component for variables that have been previously-identified as predictive of or correlative to degradation of the component may be compared to reference values for those variables for the qualitative degradation group (e.g., average values or the like) to identify deviations or other anomalies associated with the contextual operational data for the vehicle component of interest, which, in turn may be utilized to determine maintenance recommendations or the like.

While the subject matter described herein may be implemented in the context of any number of different types of components for any number of different types of vehicles, for purposes of explanation, the subject matter is described herein primarily in the context of determining maintenance recommendations for an auxiliary power unit (APU) onboard an aircraft using exhaust gas temperature (EGT) measurement data in conjunction with contextual operational data. That said, it should be appreciated that the subject matter described herein is not limited to any particular number or types of measurement data or performance data, any particular type of vehicle component, or any particular type of vehicle, and the subject matter may be implemented in an equivalent manner using other types of measurement data in the context of other types of vehicle components (e.g., flight control surfaces, environmental control systems, propulsion engines, helio engines, propellers, brake systems, rotors, motors, and/or the like) associated with other types vehicles (e.g., automotive vehicles, marine vessels, or the like).

As described in greater detail below, in one or more exemplary embodiments, EGT measurement data is obtained during operation of an APU and utilized to map the APU to a particular qualitative degradation group from among a plurality of different qualitative degradation groups defined for the make and/or model of APU based on the relationship between the EGT measurement data for the current APU of interest and historical EGT measurement data associated with the respective qualitative degradation groups. After mapping the APU to a qualitative degradation group, a predictive maintenance model determined based on relationships between historical EGT measurement data, historical contextual data, and historical maintenance data associated with APUs that constitute that qualitative degradation group is utilized to determine predictive maintenance recommendations for the APU. In this regard, the predictive maintenance model may be applied to the current or recent contextual operational data associated with the current APU being analyzed and/or the maintenance record associated with the current APU, along with the EGT measurement data, to determine recommended maintenance actions and/or timings thereof. For example, the predictive maintenance model may calculate or otherwise determine a value for one or more degradation metrics as a function of the EGT measurement data, contextual operational data and/or maintenance data associated with the APU of interest, with the calculated degradation metric value(s) being input or otherwise provided to a maintenance system or other management system that determines a maintenance schedule for the APU based on the degradation metric value(s). In this regard, in one embodiment, the degradation metric value may be realized as a likely or probable number of future operating cycles (or time interval or duration of future operation) required before progressing beyond some maintenance or replacement threshold. Thus, maintenance actions may be proactively scheduled at a convenient time and in a manner that is likely to extend operating time (e.g., "time on wing") and/or reduce downtime, unnecessary repairs (e.g., when no fault exists) or other costs.

Referring now to FIG. 1, in an exemplary embodiment, a system 100 for determining maintenance recommendations or actions for a component of a vehicle, such as an aircraft 120, includes, without limitation, a computing system 102 communicatively coupled to the vehicle, a lifecycle database 104, a maintenance database 106, and a maintenance management system 108. It should be appreciated that FIG. 1 depicts a simplified representation of the system 100 for purposes of explanation and ease of description, and FIG. 1 is not intended to limit the application or scope of the subject matter described herein in any way. In this regard, although FIG. 1 shows the various constituent elements 102, 104, 106, 108 of the system 100 as being implemented separately, in practice, one or more of the elements 102, 104, 106, 108 may be integrated with another one or more of the elements 102, 104, 106, 108. Furthermore, practical embodiments of the system 100 may include numerous other devices and components for providing additional functions and features, as will be appreciated in the art.

In the illustrated embodiment, the computing system 102 generally represents a server or other computing device, which may be located at a ground operations center or other facility located on the ground that is equipped to track, analyze, and otherwise monitor operations of one or more aircraft 120. In an exemplary embodiment, the computing system 102 includes a processing system 110 and a data storage element 112. The processing system 110 generally represents the hardware, circuitry, processing logic, and/or other components configured to analyze data obtained from the aircraft 120 to map a component of the aircraft 120 to a qualitative degradation group and perform additional processes, tasks and/or functions to support determining maintenance recommendations for the component, as described in greater detail below. Depending on the embodiment, the processing system 110 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The data storage element 112 generally represents any sort of memory or other computer-readable medium (e.g., RAM memory, ROM memory, flash memory, registers, a hard disk, or another suitable non-transitory short- or long-term storage media), which is capable of storing computer-executable programming instructions or other data for execution that, when read and executed by the processing system 110, cause the processing system 110 to execute and perform one or more of the processes tasks, operations, and/or functions described herein.

In one or more embodiments, the computing system 102 includes one or more physical interfaces, such as ports, card readers, disk readers, and/or the like that are communicatively coupled to the processing system 110 that allow the processing system 110 to access, retrieve, or otherwise obtain the flight data captured by an aircraft 120 via a corresponding physical medium (e.g., a memory card, a flash drive, a Universal Serial Bus (USB) cable, or the like). That said, in other embodiments, the computing system 102 may include a network interface or other communications interface or system communicatively coupled to the processing system 110 that allows the processing system 110 to access, retrieve, or otherwise obtain measurement data and other flight data captured by an aircraft 120 via a communications network, such as the Internet, a satellite network, a cellular network, or the like, that supports unicast or point-to-point communications to/from the aircraft 120. In some embodiments, the computing system 102 may include hardware and/or other components configured to support data link communications to/from the aircraft 120 using a data link infrastructure and/or a data link service provider.

The lifecycle database 104 generally represents any sort of memory or other computer-readable medium capable of storing or maintaining flight data in different operating record entries 105 for the lifecycles of different instances of an aircraft component of interest. For example, in one or more exemplary embodiments, each operating record entry 105 corresponds to an individual lifecycle of an individual APU between deployment and replacement, and the operating record 105 includes or otherwise maintains historical measurement data pertaining to the lifecycle of that respective APU (e.g., EGT measurement data, bleed pressure, start times, oil temperature over the lifecycle of the respective APU) and historical contextual operational data pertaining to the lifecycle of the respective APU. The historical contextual operational data may include meteorological data over the lifecycle of the respective APU (e.g., ambient temperatures, wind speeds, icing, dust storms and/or the like) or other data characterizing the operating environment over the lifecycle and flight data characterizing the behavior or manner in which the aircraft was operated over the lifecycle (e.g., altitude data, aircraft speed data, fuel type, hot shutdowns, hot starts, motoring runs, short cycles and/or the like). In this regard, the historical contextual operational data may capture, characterize or otherwise include operator (or airline) behavior or operating behaviors that the aircraft operator otherwise has control over.

The maintenance database 106 generally represents any sort of memory or other computer-readable medium capable of storing or maintaining maintenance data in different maintenance record entries 107 for the different instances of an aircraft component of interest. In this regard, a given APU having an operating record 105 in the lifecycle database 104, the maintenance database 106 may include a corresponding maintenance record 107 that includes maintenance data that characterizes the maintenance actions that have been performed on the respective APU. For example, a maintenance record 107 may include data or information that indicates the symptom(s) that were experienced during operation of the component prior to a particular maintenance action, the type, location, severity, or other characterizations of any wear or damage to the component that was identified, what elements or subcomponents required repair or replacement, the removal date or other temporal characteristics associated with a particular maintenance action, the costs associated with a particular maintenance action, and/or the like. The maintenance record 107 may include maintenance data pertaining to maintenance actions performed while the APU is installed or otherwise on wing (e.g., oil quality checks and refresh rates, and the like) in addition to data pertaining to maintenance actions performed off wing. As noted above, although FIG. 1 depicts the lifecycle and maintenance databases 104, 106 as being separate elements, in some embodiments, the databases 104, 106 may be integrated or implemented using a common data storage element.

The maintenance management system 108 generally represents a computing device or system that is coupled to the computing system 102 to receive degradation metrics, maintenance recommendations, and the like from the computing system 102. The maintenance management system 108 utilizes the maintenance information received from the computing system 102 to manage inventory, schedule subsequent maintenance actions for a component of interest, and the like. Again, although FIG. 1 depicts the maintenance management system 108 as being separate from the computing system 102, in some embodiments, features and/or functionality of the maintenance management system 108 may be integrated into or otherwise implemented by the computing system 102.

Still referring to FIG. 1, in the illustrated embodiment, the aircraft 120 includes, without limitation, a display device 122, a user input device 124, a processing system 126, a display system 128, a communications system 130, a navigation system 132, a flight management system (FMS) 134, one or more avionics systems 136, and one or more detection systems 138. The display device 122 is an electronic display capable of graphically displaying flight information or other data associated with operation of the aircraft 120 under control of the display system 128 and/or processing system 126. In this regard, the display device 122 is coupled to the display system 128 and the processing system 126, wherein the processing system 126 and the display system 128 are cooperatively configured to display, render, or otherwise convey one or more graphical representations or images associated with operation of the aircraft 120 on the display device 122. The user input device 124 is coupled to the processing system 126, and the user input device 124 and the processing system 126 are cooperatively configured to allow a user (e.g., a pilot, co-pilot, or crew member) to interact with the display device 122 and/or other elements onboard the aircraft 120. Depending on the embodiment, the user input device 124 may be realized as a keypad, touchpad, keyboard, mouse, touch panel (or touchscreen), joystick, knob, line select key or another suitable device adapted to receive input from a user, such as a microphone, audio transducer, audio sensor, or another audio input device. The display system 128 generally represents the hardware, firmware, and/or other components configured to control the display and/or rendering of one or more displays pertaining to operation of the aircraft 120 and/or systems 130, 132, 134, 136, 138 on the display device 122 (e.g., synthetic vision displays, navigational maps, and the like).

The processing system 126 generally represents the hardware, circuitry, processing logic, and/or other components configured to facilitate communications and/or interaction with the computing system 102 to transmit or otherwise provide measurement data and other flight data or information obtained by one of more onboard systems 132, 134, 136, 138 to the computing system 102 or otherwise support the subject matter described herein. Depending on the embodiment, the processing system 126 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 126 includes processing logic that may be configured to carry out the functions, techniques, and processing tasks described herein. Furthermore, the steps of a method or algorithm described in connection with the embodiments disclosed herein may be embodied directly in hardware, in firmware, in a software module executed by the processing system 126, or in any practical combination thereof. In accordance with one or more embodiments, the processing system 126 includes or otherwise accesses a computer-readable medium, such as a memory or another suitable non-transitory short or long term storage media, which is capable of storing computer-executable programming instructions or other data for execution that, when read and executed by the processing system 126, cause the processing system 126 to execute and perform one or more of the processes tasks, operations, and/or functions described herein. In some embodiments, the display device 122, the user input device 124, and/or the processing system 126 may be implemented as an electronic flight bag that is separate from the aircraft 120 but capable of being communicatively coupled to the other elements of the aircraft 120 when onboard the aircraft 120.

In exemplary embodiments, the navigation system 132 provides real-time navigational data and/or information regarding operation of the aircraft 120 to the processing system 126 and/or display system 128 to support rendering the display(s) on the display device 122. The navigation system 132 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 132, as will be appreciated in the art. The navigation system 132 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 132 is also capable of obtaining or otherwise determining the heading of the aircraft 120 (i.e., the direction the aircraft is traveling in relative to some reference).

In the illustrated embodiment, the processing system 126 is coupled to the communications system 130, which is configured to support communications to and/or from the aircraft 120. In this regard, the communications system 130 may include an interface for communicatively coupling the aircraft 120 and/or processing system 126 to a communications network that supports utilizing unicast or point-to-point communications to/from the aircraft 120 via the network. In some embodiments, the communications system 130 may also include a data link system or another suitable radio communication system that supports communications between the aircraft 120 and the computing system 102. Additionally, the communications system 130 may also support communications between the aircraft 120 and air traffic control or another command center or ground location. The processing system 126 is also coupled to the FMS 134, which is coupled to the navigation system 132, the communications system 130, and one or more additional avionics systems 136 to support navigation, flight planning, and other aircraft control functions in a conventional manner, as well as to provide real-time data and/or information regarding the operational status of the aircraft 120 to the processing system 126.

In exemplary embodiments, the onboard detection system(s) 138 are coupled to the processing system 126 and/or the display system 128 to generate or otherwise provide information indicative of various objects or regions of interest within the vicinity of the aircraft 120 that are sensed, detected, or otherwise identified by a respective onboard detection system 138. In one or more embodiments, an onboard detection system 138 is realized as a weather radar system or other weather sensing system that measures, senses, or otherwise detects meteorological regions or other weather conditions in the vicinity of the aircraft 120 and provides corresponding radar data (e.g., radar imaging data, range setting data, angle setting data, and/or the like) to one or more of the other onboard systems 126, 128, 130, 132, 134, 136 for further processing and/or handling.

Additionally, in practice, the aircraft 120 will likely include numerous avionics systems not illustrated in FIG. 1 for obtaining and/or providing real-time flight-related information. For example, practical embodiments of the aircraft 120 will likely include one or more of the following avionics systems 136 suitably configured to support operation of the aircraft 120: an air traffic management system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Additionally, although FIG. 1 shows a single display device 122, in practice, additional display devices may be present onboard the aircraft 120. Lastly, it should be noted that in other embodiments, features and/or functionality of processing system 126 described herein can be implemented by or otherwise integrated with the features and/or functionality provided by the display system 128 or the FMS 134. In other words, some embodiments may integrate the processing system 126 with the display system 128 or the FMS 134, that is, the processing system 126 described herein may be a component of the display system 128 and/or the FMS 134.

In exemplary embodiments, one of the onboard avionics systems 136 is realized as a starting system that is operable to initiate rotation of a shaft of an aircraft engine to draw air into the engine's compression chamber to support combustion or lighting the engine. In exemplary embodiments, the starting system 136 includes an APU, and potentially one or more additional components (e.g., a starter motor or other electric motor, an ignition system, a fuel injection system, and/or a suitable combination thereof). In some embodiments, the starting system 136 also includes one or more temperature sensors configured to measure the temperature of the exhaust gas of the APU. That said, in other embodiments, exhaust gas temperature may be measured by another sensor system 136 onboard the aircraft 120. In exemplary embodiments, the processing system 126 is coupled to the starting system and/or sensor system onboard the aircraft 120 to obtain the EGT measurement data and other data characterizing the operation of the APU. The processing system 126 may maintain a record in a data storage element onboard the aircraft 120 that stores or otherwise maintains the EGT measurement data and other APU operating data obtained during operation of the aircraft 120 for subsequent transmission or provisioning to the computing system 102, as described in greater detail below.

Figure 2:
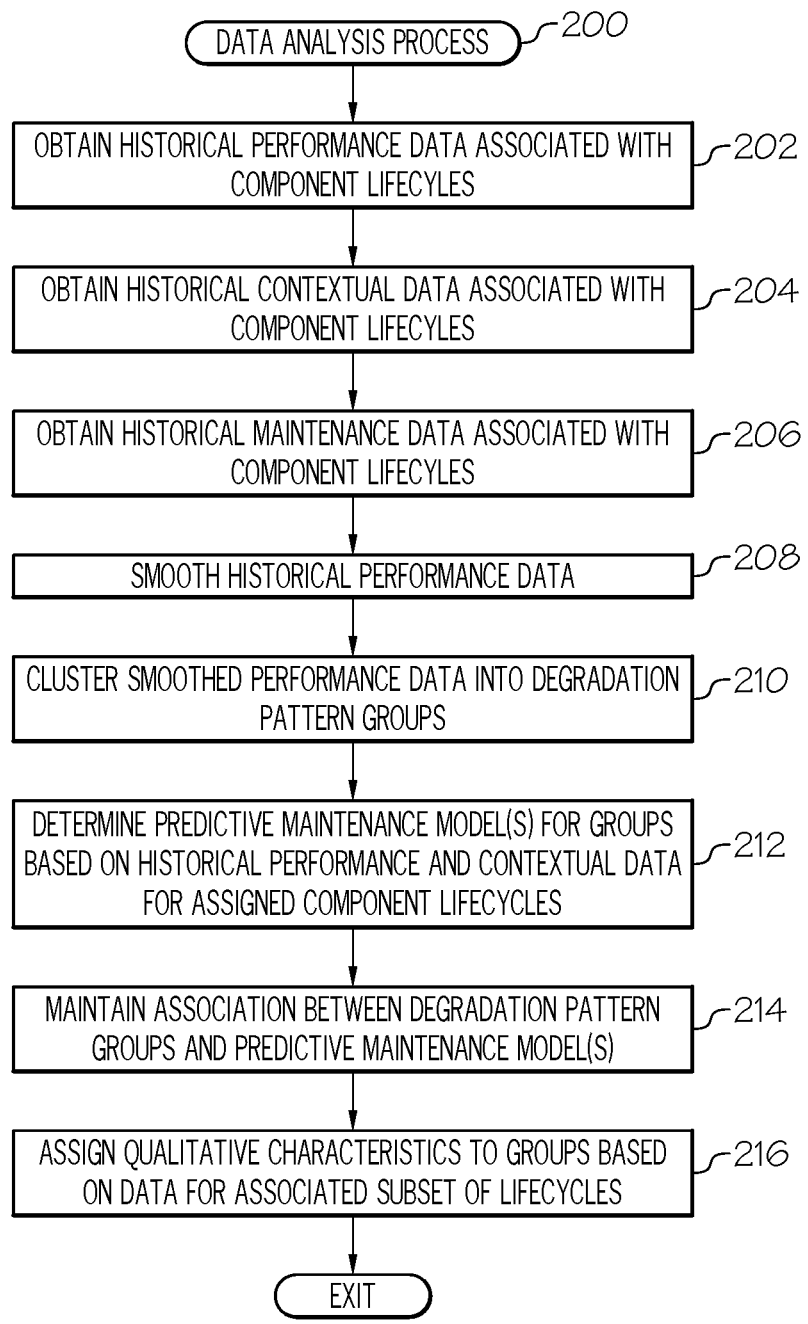
FIG. 2 is a flow diagram of an exemplary data analysis process suitable for use with the system of FIG. 1 in accordance with one or more embodiments.

FIG. 2 depicts an exemplary embodiment of a data analysis process 200 suitable for use in developing predictive maintenance models for vehicle components, such as an aircraft APU. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the data analysis process 200 may be performed by different elements of the system 100, however, exemplary embodiments may be described herein as primarily being performed by the computing system 102 and/or the processing system 110. It should be appreciated that the data analysis process 200 may include any number of additional or alternative tasks, the tasks need not be performed in the illustrated order and/or the tasks may be performed concurrently, and/or the data analysis process 200 may be incorporated into a more comprehensive procedure or process having additional functionality not described in detail herein. Moreover, one or more of the tasks shown and described in the context of FIG. 2 could be omitted from a practical embodiment of the data analysis process 200 as long as the intended overall functionality remains intact.

The illustrated data analysis process 200 receives or otherwise obtains historical performance data associated with the prior lifecycles of different instances of a component of interest (task 202). In this regard, the computing system 102 and/or the processing system 110 may obtain, from the lifecycle database 104, for various instances of a given component, historical measurement data indicative of the performance of the respective components that was captured or otherwise obtained during the respective lifecycles of the respective components. For example, for each APU, the lifecycle database 104 may maintain a corresponding operating record 105 that maintains EGT measurement data, bleed pressure, measured or sensed inlet guide vane position data, measured fuel pump pressure, measured oil temperature, and/or other measurement data obtained during the lifecycle of that respective APU. For purposes of explanation and simplicity, the subject matter is primarily described herein in the context of the EGT measurement data, but in practice, the subject matter may be implemented in a multivariate manner that considers multiple different performance variables when clustering or grouping components.

Additionally, the data analysis process 200 receives or otherwise obtains historical contextual operational data associated with the prior lifecycles of different instances of a component of interest (task 204). Similar to the performance measurement data, the operating records 105 in the lifecycle database 104 may maintain meteorological data and/or other data characterizing the operating environment or context during the prior lifecycles of the respective components, which may be retrieved or otherwise obtained by the computing system 102 and/or the processing system 110 when obtaining the historical measurement data. In this regard, the historical contextual operational data may be captured or obtained by one or more components onboard an aircraft 120 or from other sources concurrently or contemporaneously to the measurement data indicative of the component performance The data analysis process 200 also receives or otherwise obtains historical maintenance data associated with the prior lifecycles of different instances of a component of interest (task 206). In this regard, for each APU, the maintenance database 106 may maintain a corresponding maintenance record 107 that indicates the maintenance actions that were performed or required during and/or at the end of the respective lifecycle of the respective APU. In some embodiments, the maintenance record 107 for a given APU may be utilized to subdivide the operating record 105 for that APU into different lifecycles. For example, in exemplary embodiments, an APU lifecycle is realized as the period of time between maintenance visits (or the period of time between initial deployment and an initial maintenance visit), with the maintenance data being utilized to subdivide the performance measurement data and contextual data captured throughout the lifetime of that APU into discrete lifecycles.

In exemplary embodiments, the data analysis process 200 smooths the historical performance data for the various instances of the component of interest before clustering different subsets of instances of the component into different degradation groups (tasks 208, 210). In this regard, the EGT measurement data samples and the like are smoothed or otherwise adjusted to mitigate the effects of noise, spurious measurements, or other disturbances, for example, using locally weighted smoothing (LOESS) or other regression techniques. It should be noted that the subject matter described herein is not limited to any particular type of smoothing technique or algorithm, and various different smoothing techniques may be employed, either individually or in combination. In some embodiments, APU lifecycles are also filtered or excluded from consideration after smoothing the historical performance data prior to performing the clustering analysis. For example, an APU lifecycle exhibiting a sufficient jump or discontinuity within the smoothed EGT measurement data during the lifecycle may be excluded or filtered from further analysis. Thereafter, the remaining smoothed EGT measurement data sets are analyzed using one or more clustering analysis techniques to assign different APU lifecycles into different degradation groups based on similarities between the smoothed EGT measurement data among APU lifecycles.

Figure 3A:
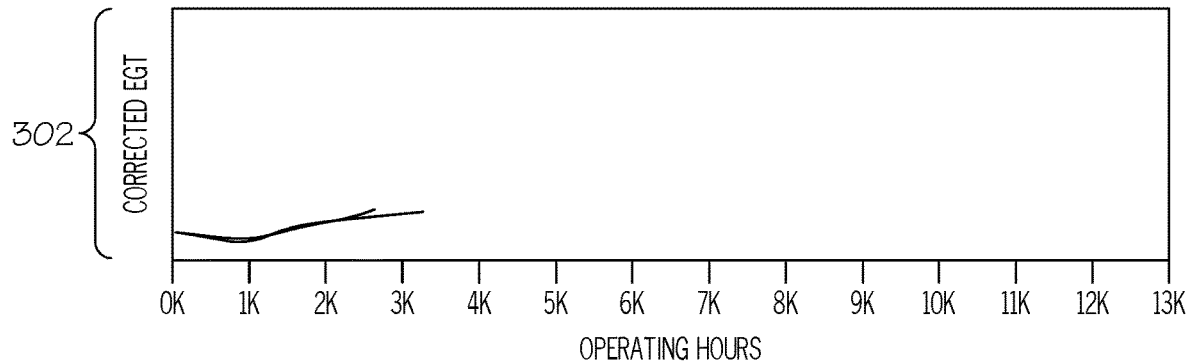
FIGS. 3A-3C depict different degradation groups of component lifecycles that may be clustered together in connection with the data analysis process of FIG. 2 in an exemplary embodiment.
Figure 3B:
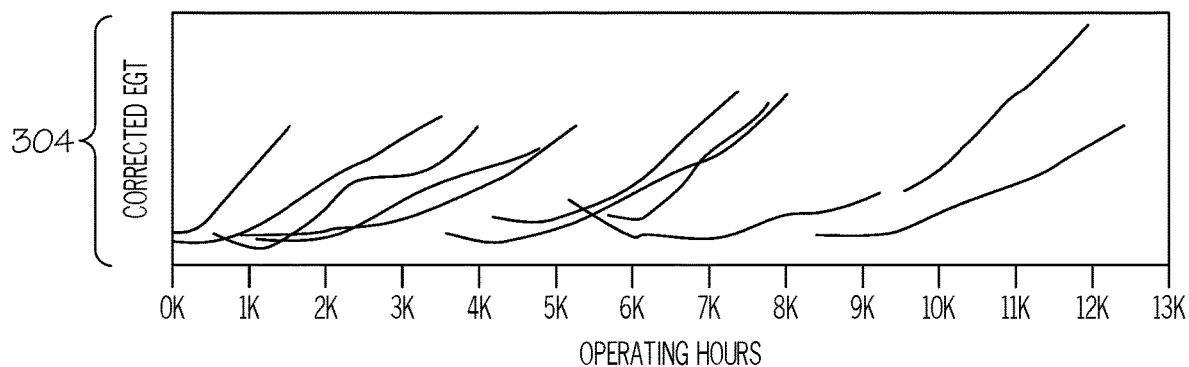
Figure 3C:
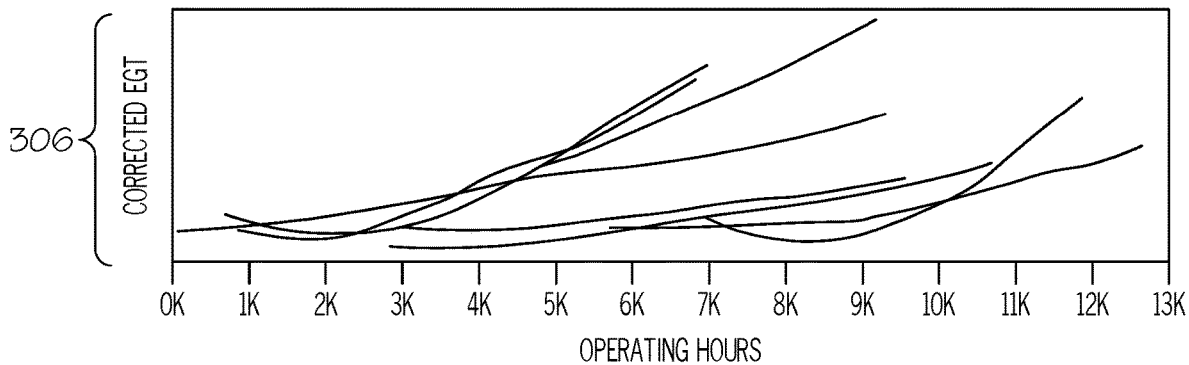

In exemplary embodiments, a shape-based clustering technique is utilized to identify APU lifecycles having associated performance data exhibiting a similar shape. For example, one or more sets of the smoothed EGT measurement data may be downsampled such that each set of smoothed EGT measurement data has the same number of data points. This is done to retrieve the same number of data points per lifecycle since each APU may be in the field for a different amount of time relative to other APUs. The smoothed data sample values and piecewise slopes of those samples may then be clustered into a desired number of degradation groups using an appropriate clustering technique. In exemplary embodiments, a hierarchical clustering is performed to initially cluster the APU lifecycles into different sets of APU lifecycles having similar shape before performing additional clustering. Additional clustering of the shape-based clusters is performed create subsets of APU lifecycles having similar shape and lifecycle durations. For example, Euclidean distance may be utilized to initially cluster the smoothed EGT measurement data into a set of groups based on shape similarities with respect to the downsampled (or upsampled) data sets having the same number of data points. Thereafter, the smoothed EGT measurement data for the data sets within these groups is then analyzed using hierarchical clustering of the APU lifecycle duration. The different lifecycle degradation groups are to be used for further modeling and analysis. For example, FIGS. 3A-3C depict graphs 302, 304, 306 of the smoothed EGT measurement data for APU lifecycles clustered into different degradation groups, which were initially clustered together due to shape similarities. In this regard, the first degradation group graph 302 depicts smoothed EGT measurement data for APU lifecycles having a similar shape but shorter duration than the APU lifecycles depicted in the second degradation group graph 304, which, in turn, has a similar shape but shorter duration than the APU lifecycles depicted in the third degradation group graph 306.

Still referring to FIG. 2, in exemplary embodiments, the data analysis process 200 determines predictive maintenance models for each of the degradation groups based on the relationships between the historical contextual operational data associated with the APU lifecycles clustered into a respective degradation group and the historical maintenance data following the APU lifecycles clustered into the respective degradation group (task 212). In this regard, a correlation analysis is performed to identify which contextual operational variables are most strongly correlated to the resulting maintenance actions that were performed, the maintenance cost and/or the lifecycle duration. For example, an equation, function, or model for calculating an expected lifecycle duration as a function of the EGT measurement data and one or more contextual operational variables (e.g., temperature, humidity, geographic location, climate zone, and/or the like) may be determined based on the degree to which those contextual operational variables are correlative to the observed lifecycle durations for the APU lifecycles classified into a respective degradation group. Similarly, an equation, function, or model for calculating a probability or likelihood of a particular maintenance action as a function of one or more performance variables and one or more contextual operational variables may be determined.

In one or more exemplary embodiments, the computing system 102 and/or the processing system 110 utilizes machine learning or other artificial intelligence techniques to determine which combination of historical measurement data and historical contextual operational data delivery data are correlated to or predictive of the lifecycle duration or a particular maintenance action, and then determines a corresponding equation, function, or model for calculating a metric indicative of that outcome of interest based on that subset of correlative input variables. Thus, the model is capable of characterizing or mapping a particular combination of the current (or recent) EGT measurement data (or other measured APU performance data) and one or more of the current (or recent) contextual operational variables to a value representative of the current probability or likelihood of a particular maintenance action or an expected lifecycle duration. It should be noted that since each degradation group is constituted by a unique subset of APU lifecycles, the subset of input variables that are predictive of or correlative for a particular outcome for one degradation group may vary from other degradation groups. Additionally, the relative weightings applied to the respective variables of that predictive subset may also vary from other degradation groups based on differing correlations between the particular input variables and the historical maintenance data for that particular degradation group. It should be noted that any number of different machine learning techniques may be utilized by the computing system 102 and/or the processing system 110 to determine what input variables are predictive for a particular outcome. That said, in exemplary embodiments, association rule mining is utilized to identify factors relevant to a particular outcome of interest.

After determining predictive maintenance models, the data analysis process 200 maintains the predictive maintenance models in association with their respective degradation group (task 214). For example, the computing system 102 and/or the processing system 110 may store or otherwise maintain the predictive maintenance models in a data storage element (e.g., memory 112 or one of the databases 104, 106) in association with the different degradation groups. In the illustrated embodiment, the data analysis process 200 also assigns one or more qualitative characteristics to the respective degradation groups based on one or more factors (task 216). For example, degradation groups may be assigned one or more different qualitative designations (e.g., best, worst, standard, optimum, etc.) for one or more different attributes (e.g., lifecycle duration, repair cost, and the like) that characterize or otherwise summarize performance data, contextual operational data, and/or maintenance data for the APU lifecycles classified within a respective degradation group relative to the APU lifecycles classified within other degradation groups. In this regard, a degradation group having the lowest average or median repair cost may be assigned a qualitative designation that indicates APU lifecycles mapped to that degradation group are likely to have the best cost performance At the same time, a different qualitative designation may be assigned to the degradation group based on the average lifecycle duration for APU lifecycles mapped to that degradation group corresponding to the average APU lifecycle duration across all degradation groups (e.g., standard).

Figure 4:
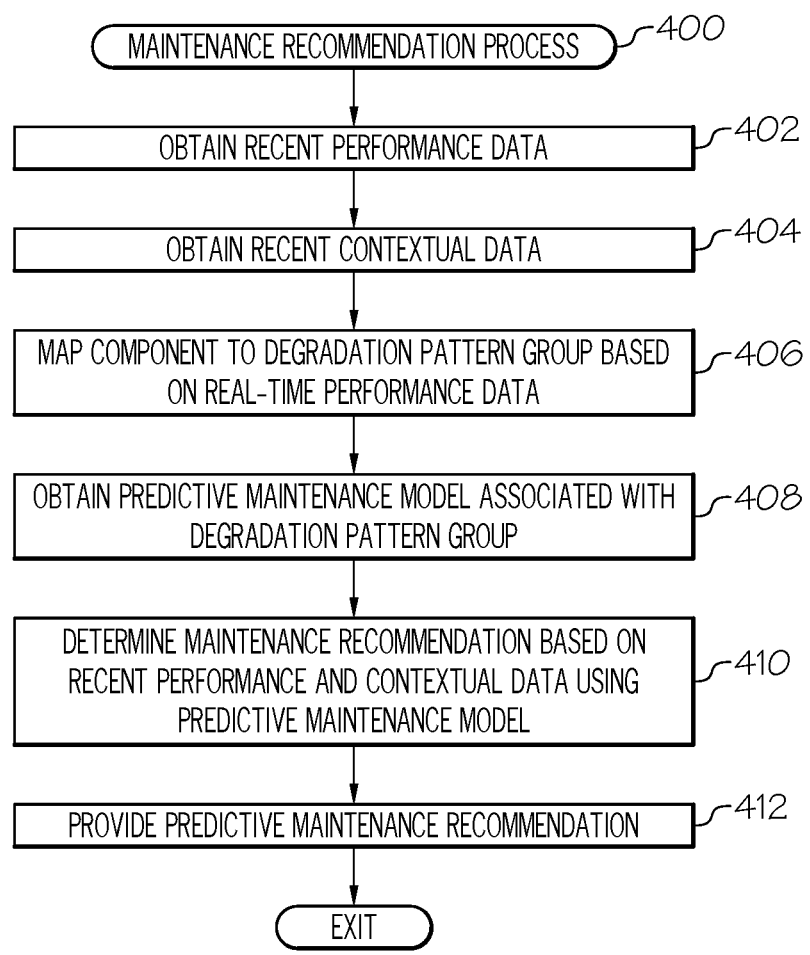
FIG. 4 is a flow diagram of an exemplary maintenance recommendation process suitable for use with the system of FIG. 1 in conjunction with the data analysis process of FIG. 2 in accordance with one or more embodiments.

FIG. 4 depicts an exemplary embodiment of a maintenance recommendation process 400 suitable for use in connection with the data analysis process 200 of FIG. 2 to provide real-time maintenance recommendations or other maintenance information based on operation of a vehicle component, such as an aircraft APU. The various tasks performed in connection with the illustrated process 400 may be implemented using hardware, firmware, software executed by processing circuitry, or any combination thereof. For illustrative purposes, the following description may refer to elements mentioned above in connection with FIG. 1. In practice, portions of the maintenance recommendation process 400 may be performed by different elements of the system 100, however, exemplary embodiments may be described herein as primarily being performed by the computing system 102 and/or the processing system 110. It should be appreciated that the maintenance recommendation process 400 may include any number of additional or alternative tasks, the tasks need not be performed in the illustrated order and/or the tasks may be performed concurrently, and/or the maintenance recommendation process 400 may be incorporated into a more comprehensive procedure or process having additional functionality not described in detail herein. Moreover, one or more of the tasks shown and described in the context of FIG. 4 could be omitted from a practical embodiment of the maintenance recommendation process 400 as long as the intended overall functionality remains intact.

The illustrated maintenance recommendation process 400 initializes by receiving or otherwise obtaining recent measurement data indicative of the performance or usage of a component of interest (task 402). For example, after completion of a flight, the processing system 126 onboard the aircraft 120 may transmit or otherwise provide (e.g., via a communications network, a wired communications medium, a removeable computer-readable medium, or the like) the EGT measurement data, inlet guide vane position measurement data, fuel pump pressure measurement data, oil temperature measurement data, and/or other performance measurement data associated with an APU of the aircraft 120 that were obtained during the most recent flight to the computing system 102 for updating the operating record 105 associated with the APU. Additionally, maintenance recommendation process 400 receives or otherwise obtains recent contextual operational data associated with the usage of the component of interest (task 404). In this regard, the computing system 102 and/or the processing system 110 also obtains, from the processing system 126 onboard the aircraft 120, measured or sensed meteorological data (e.g., ambient temperatures, wind speeds, and/or the like) and/or other flight data characterizing the operating environment, behavior, or manner in which the aircraft was operated during the preceding flight (e.g., altitude data, aircraft speed data, and/or the like).

The maintenance recommendation process 400 continues by mapping or otherwise classifying the component into a particular degradation group based at least in part on the recent performance measurement data (task 406). For example, in a similar manner as described above, the recent performance measurement data for the APU along with preceding performance measurement data maintained in the operating record 105 associated with the APU may be smoothed and then analyzed to assign the current lifecycle of the APU to a particular degradation group, for example, based on the minimum Euclidean distance between the current APU lifecycle and a mean, median or other reference representation of the APU lifecycles classified into the different degradation groups. For each degradation group, a respective distance between the measurement data indicative of the performance during current lifecycle of the APU and reference measurement data representative of the respective degradation group may be determined, resulting in a plurality of distances between the current APU lifecycle and the different degradation groups, which, in turn, may be analyzed to identify the degradation group having the minimum distance from the current APU lifecycle and thereby assign the current APU lifecycle to that identified degradation group. Yet other embodiments could assign the current APU lifecycle to a particular degradation group using one or more probabilistic models or other techniques, which may adapt as the amount of available data increases.

After mapping the component of interest to a degradation group, the maintenance recommendation process 400 retrieves or otherwise obtains the predictive maintenance model(s) associated with the assigned degradation group, applies the predictive maintenance model(s) to the current or most recently obtained performance measurement data and contextual operational data for the component to determine predictive maintenance recommendations, and then outputs or otherwise provides the predictive maintenance recommendations (tasks 406, 408, 410). For example, the EGT measurement data and/or one or more contextual operational variables from the most recent flight may be input or otherwise provided to expected lifecycle duration model to calculate or otherwise determine an expected lifecycle duration for the APU that is influenced by the most recent flight for that APU along with the degradation group the APU is assigned to. In this regard, the output of the predictive maintenance model reflects the most recent or real-time operations of the APU in relation to historically similar APU lifecycles. The resulting expected lifecycle duration for the APU may be utilized to recommend or otherwise schedule maintenance on the APU. For example, if the current APU lifecycle duration is within a threshold of the expected lifecycle duration, a notification may be generated or otherwise provided at or by the computing system 102, onboard the aircraft 120 (e.g., via the display device 122 or another output user interface), or otherwise transmitted or provided to an aircraft operator to indicate maintenance on the APU is recommended. Additionally, or alternatively, the expected lifecycle duration may be provided to a maintenance management system 108 determines a maintenance schedule for the APU based on the expected lifecycle duration.

As another example, the performance measurement data and/or contextual operational variables from the most recent flight may be input or otherwise provided to a predictive maintenance model that calculates or otherwise determines the probability of a particular type of maintenance being required. In some embodiments, when the probability is greater than a threshold, a notification may be generated or otherwise provided that recommends that particular maintenance action be performed. Additionally, or alternatively, the probability of a particular maintenance action being required may be provided to the maintenance management system 108, which, in turn, determines a schedule for when to perform that maintenance action on the APU based on the calculated probability value. It should be noted that there are numerous potential combinations of predictive maintenance models that could be employed, as well as numerous different ways to provide corresponding notifications based on the outputs of the various predictive maintenance models, and the subject matter described herein is not limited to any particular manner of providing maintenance recommendations.

In some embodiments, in connection with providing maintenance recommendations, the maintenance recommendation process 400 also provides feedback based on the degradation group the current component of interest is mapped to. For example, a notification that includes or otherwise indicates the qualitative characteristics associated with or otherwise assigned to that degradation group may be provided to an aircraft operator, a pilot, maintenance personnel, or the like (e.g., at or by the computing system 102 or via an onboard user interface device 122), thereby allowing a human user to better understand the likely or probable qualitative nature of the APU operation and performance Additionally, the predictive maintenance model(s) associated with the degradation group may be used to provide recommendations for operating the APU to increase the expected lifecycle duration, decrease the expected maintenance costs, and/or the like. For example, based on the current or recent performance measurement data for the APU as inputs to a predictive maintenance recommendation model, the maintenance recommendation process 400 may utilize the predictive maintenance model to optimize or otherwise identify recommended values or states for one or more contextual operational variables that maximize, minimize, or otherwise optimize the output of the predictive maintenance model, such as, for example, identifying a climate zone that would maximize the expected lifecycle duration, minimize the expected maintenance cost, minimize the probability of a particular type of maintenance action, or the like. A corresponding indication of the recommended contextual operational variables may be generated or otherwise provided to an aircraft operator, a pilot, or the like to influence future operation of the APU to achieve increased longevity, lower maintenance costs, or the like. For example, an aircraft operator may alter the upcoming flight schedule for the aircraft 120 to increase the relative usage of the aircraft 120, and thereby the APU, in a recommended climate zone and/or decrease the relative usage of the aircraft 120 in climate zones that are more likely to increase maintenance costs, decrease lifecycle, etc. In this regard, such proactive alterations of the aircraft 120 operation could produce a corresponding change in the future performance measurement data for the APU, which, in turn results in the APU being mapped to a better qualitative degradation group. In this manner, some embodiments of the maintenance recommendation process 400 may utilize the predictive maintenance models and/or other historical data associated with the different qualitative degradation groups to recommend or suggest modifications to the operation of the aircraft 120 that are likely to influence the degradation pattern exhibited by the performance measurement data for the APU and result in the APU being subsequently reclassified into a different degradation group over time.

As noted above, although the subject matter is primarily described herein in the context of clustering vehicle components based on performance measurement data (e.g., EGT measurement data), in some embodiments, the clustering may be multivariate across the performance measurement data and additional performance measurement data. In this regard, in practice, vehicle components could be clustered based on their performance measurement data and one or more contextual operational variables (e.g., climate zone, ambient temperature, ambient humidity, and/or the like) that are correlative to or predictive of a particular maintenance outcome. Thus, it should be noted that the subject matter described herein may be performed in connections with clustering based on any number of potential variables, individually or in combination. That said, it should be noted that the input variables for the predictive maintenance models may be independent of the variables used to cluster vehicle components.

Still referring to FIG. 4, it should be noted that after the maintenance recommendation process 400 has been performed and maintenance is performed on the component of interest, the data analysis process 200 of FIG. 2 may be repeated to dynamically update the degradation groups and/or the predictive maintenance models to account for the recently completed lifecycle of that component. Thus, the constituencies of the degradation groups and/or the predictive maintenance models based thereon may be dynamically updated or otherwise evolve over time as more data becomes available.

By virtue of the subject matter described herein, an expected lifecycle for a vehicle component may be more accurately determined based on similarities between how the vehicle component has actually been used or operated and the lifecycles for previous instances of vehicle components. By identifying and recognizing the vehicle component as exhibiting a degradation pattern similar to previous instances of the vehicle component, improved maintenance recommendations may be provided for the current vehicle component substantially in real-time. As a result, it may be possible to reduce maintenance costs, extend the lifecycle of the vehicle component, or otherwise avoid premature replacement or maintenance. In this regard, even though different instances of the vehicle component may exhibit a relatively wide range of lifecycle durations or require varying amount of maintenance, by clustering similar degradation patterns and identifying the variables or factors correlative thereto, subsequent instances of the vehicle component may be mapped to a particular degradation group, which, in turn, may be utilized to more accurately and reliably predict the future degradation of the vehicle component based on the manner in which the vehicle component is operated or utilized relative to other instances of vehicle components in that degradation group.

For the sake of brevity, conventional techniques related to component monitoring, maintenance, and inspections, clustering, smoothing, machine learning, artificial intelligence, data analysis and other aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of monitoring a component of a vehicle, the method comprising:
   obtaining measurement data characterizing operation of the component for an individual lifecycle between deployment and maintenance, wherein the measurement data is measured by one or more sensors during operation of the vehicle during the individual lifecycle;
   obtaining contextual data associated with the operation of the vehicle over the individual lifecycle, wherein the contextual data includes at least one of ambient meteorological data or climate zone data pertaining to operation of the vehicle over the individual lifecycle between deployment and replacement of the component;
   clustering the component to a first degradation group from among a plurality of different degradation groups based on a relationship between the measurement data and the contextual data for the individual lifecycle and historical measurement data and historical contextual data associated with a subset of different instances of the component of the first degradation group, wherein the first degradation group comprises a respective subset of prior lifecycles for a respective subset of different instances of the component and the historical measurement data and historical contextual data comprise respective measurement data and respective contextual data characterizing operation of respective instances of the respective subset of different instances of the component for respective prior lifecycles between deployment and maintenance of the respective instance of the component;
   determining a value for a degradation metric indicative of an expected lifecycle duration for the component in the future before progressing beyond a threshold as a function of the measurement data for the individual lifecycle and the contextual data over the individual lifecycle using a predictive maintenance model associated with the first degradation group; and
   outputting, via a user interface device, a notification of a particular maintenance action recommended to be proactively scheduled and an indication of the expected lifecycle duration for the component before progressing beyond the threshold.

2. The method of claim 1, wherein clustering the component comprises:
   determining, for each degradation group, a respective distance between the measurement data indicative of the performance of component and representative data for the respective degradation group; and
   identifying the first degradation group as having a minimum distance between the measurement data indicative of the performance of component and representative data for the first degradation group.

3. The method of claim 1, further comprising identifying the plurality of different degradation groups based on similarities between respective subsets of the historical measurement data, wherein each degradation group of the plurality of degradation groups comprises a respective subset of prior lifecycles for a respective subset of different instances of the component.

4. The method of claim 3, further comprising:
   obtaining the historical contextual data associated with the respective subset of prior lifecycles for the subset of different instances of the component identified as the first degradation group based on the respective subset of historical measurement data for the respective subset of prior lifecycles identified as the first degradation group; and
   determining the predictive maintenance model associated with the first degradation group based at least in part on the historical contextual data associated with the respective subset of prior lifecycles and the respective subset of historical measurement data for the respective subset of prior lifecycles.

5. The method of claim 4, further comprising obtaining historical maintenance data associated with the respective subset of prior lifecycles, wherein determining the predictive maintenance model comprises determining the predictive maintenance model based at least in part on relationships between the historical maintenance data, the historical contextual data, and the respective subset of historical measurement data.

6. The method of claim 5, wherein:
   determining the predictive maintenance model comprises:
      performing association rule mining to identify a contextual variable as being correlative to the historical maintenance data; and
      determining the predictive maintenance model as a function of the contextual variable;
   the contextual data associated with operation of the vehicle includes recent data for the contextual variable; and
   determining the maintenance recommendation comprises determining the maintenance recommendation based at least in part on the recent data for the contextual variable using the predictive maintenance model.

7. The method of claim 5, wherein clustering the component comprises:
   for each degradation group:
      determining representative data for the respective degradation group based on the respective subset of the historical measurement data for the respective subset of prior lifecycles for a respective subset of different instances of the component assigned to the respective degradation group; and
      determining a respective distance between the measurement data indicative of the performance of component and the representative data for the respective degradation group; and
   identifying the first degradation group as having a minimum distance between the measurement data indicative of the performance of component and representative data for the first degradation group.

8. The method of claim 1, wherein the vehicle comprises an aircraft, the component comprises an auxiliary power unit (APU), and the measurement data comprises at least one of exhaust gas temperature (EGT) measurement data, inlet guide vane position measurement data, fuel pump pressure measurement data, and oil temperature measurement data.

9. The method of claim 8, further comprising performing clustering to identify the plurality of different degradation groups based on similarities between respective subsets of historical EGT measurement data associated with respective subsets of prior lifecycles for instances of the APU.

10. The method of claim 1, wherein determining the maintenance recommendation comprises calculating a probability of a maintenance action for the component based on the contextual data using the predictive maintenance model associated with the first degradation group, wherein a maintenance schedule for the component is influenced by the probability of the maintenance action.

11. The method of claim 1, wherein:
   a maintenance recommendation comprises the particular maintenance action and the indication of the expected lifecycle duration; and
   a maintenance schedule for the component is influenced by the maintenance recommendation to extend operating time when no fault exists with respect to the component.

12. The method of claim 1, wherein the individual lifecycle comprises a discrete period of time subdividing a lifetime of the component and the respective prior lifecycles comprise respective discrete periods of time subdividing respective lifetimes of respective instances of the respective subset of different instances of the component.

13. The method of claim 1, wherein the notification comprises identification of a recommended climate zone that would maximize the expected lifecycle duration or minimize the probability of the particular maintenance action.

14. The method of claim 1, wherein the component comprises an auxiliary power unit (APU), the vehicle comprises an aircraft, and the particular maintenance action comprises altering an upcoming flight schedule to increase usage of the aircraft in a recommended climate zone.

15. The method of claim 1, wherein the component comprises an auxiliary power unit (APU), the vehicle comprises an aircraft, and the particular maintenance action comprises altering an upcoming flight schedule to decrease usage of the aircraft in a climate zone more likely to increase maintenance costs or decrease the expected lifecycle duration.

16. A method of monitoring an APU onboard an aircraft, the method comprising:
   obtaining exhaust gas temperature (EGT) measurement data during operation of the APU for an individual lifecycle between deployment and maintenance of the APU, wherein the EGT measurement data is measured by one or more sensors during operation of the aircraft during the individual lifecycle;
   obtaining contextual data for the APU, wherein the contextual data includes at least one of ambient meteorological data or climate zone data pertaining to operation of the aircraft over the individual lifecycle between deployment and replacement of the APU;
   identifying the APU as belonging to a first degradation group of APU lifecycles from among a plurality of degradation groups based on a relationship between the EGT measurement data and the contextual data for the individual lifecycle and historical EGT measurement data and historical contextual data associated with the APU lifecycles of a subset of different instances of the APU assigned to the first degradation group, wherein the first degradation group comprises a respective subset of prior lifecycles for the subset of different instances of the APU and the historical measurement data and historical contextual data comprise respective measurement data and respective contextual data characterizing operation of respective instances of the APU for respective prior lifecycles between deployment and maintenance of the respective instance of the APU;
   determining a predictive maintenance model for the first degradation group based on relationships between the historical EGT measurement data associated with the APU lifecycles of the first degradation group, historical contextual data associated with the APU lifecycles of the first degradation group, and historical maintenance data associated with the APU lifecycles of the first degradation group;
   determining a value for a degradation metric indicative of an expected lifecycle duration for the APU in the future before progressing beyond a threshold based on the EGT measurement data and the contextual data using the predictive maintenance model associated with the first degradation group; and
   outputting, via a user interface device, a notification of maintenance recommendation via a user interface device, wherein:
      the maintenance recommendation comprises a particular maintenance action and an indication of the expected lifecycle duration for the APU before progressing beyond the threshold; and
      a maintenance schedule for the APU is influenced by the maintenance recommendation.

17. The method of claim 16, further comprising determining the plurality of degradation groups by clustering different subsets of APU lifecycles based on similarity between the respective historical EGT measurement data associated with respective APU lifecycles of the respective degradation groups.

18. The method of claim 17, wherein identifying the APU as belonging to a first degradation group comprises:
   determining, for each degradation group, a respective distance between the EGT measurement data and representative EGT measurement data determined based the respective historical EGT measurement data associated with respective APU lifecycles of the respective degradation groups; and
   identifying the first degradation group as having a minimum distance between the EGT measurement data and the representative EGT measurement data for the first degradation group.

19. The method of claim 16, wherein determining the predictive maintenance model comprises performing association rule mining using the historical EGT measurement data associated with the APU lifecycles of the first degradation group and historical contextual data associated with the APU lifecycles of the first degradation group with respect to the historical maintenance data associated with the APU lifecycles of the first degradation group.

20. A non-transitory computer-readable medium having computer-executable instructions stored thereon that, when executed by a processing system, cause the processing system to:
   obtain measurement data characterizing operation of a component of a vehicle for an individual lifecycle between deployment and maintenance of the component, wherein the measurement data is measured by one or more sensors during operation of the vehicle during the individual lifecycle;
   obtain contextual data associated with the operation of the vehicle over the individual lifecycle, wherein the contextual data includes at least one of ambient meteorological data or climate zone data pertaining to operation of the vehicle over the individual lifecycle between deployment and replacement of the component;

map the component to a first degradation group from among a plurality of different degradation groups based on a relationship between the measurement data and the contextual data for the individual lifecycle and historical measurement data and historical contextual data associated with a subset of different instances of the component of the first degradation group, wherein the first degradation group comprises a respective subset of prior lifecycles for a respective subset of different instances of the component and the historical measurement data and historical contextual data comprise respective measurement data and respective contextual data characterizing operation of respective instances of the respective subset of different instances of the component for respective prior lifecycles between deployment and maintenance of the respective instance of the component;

determine a value for a degradation metric indicative of an expected lifecycle duration for the component in the future before progressing beyond a threshold as a function of the measurement data for the individual lifecycle and the contextual data over the individual lifecycle using a predictive maintenance model associated with the first degradation group; and output, via a user interface device coupled to the processing system, a notification of a particular maintenance action recommended to be proactively scheduled and an indication of the expected lifecycle duration for the component before progressing beyond the threshold.

\* \* \* \* \*